(12) United States Patent
Poon

(10) Patent No.: US 6,717,985 B1
(45) Date of Patent: Apr. 6, 2004

(54) TECHNIQUE FOR EFFICIENTLY EQUALIZING A TRANSMISSION CHANNEL IN A DATA TRANSMISSION SYSTEM

(75) Inventor: Kar-Fat Poon, Vellinge (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/521,431

(22) Filed: Mar. 8, 2000

(51) Int. Cl.[7] .................................................. H03H 7/30
(52) U.S. Cl. ....................................................... 375/229
(58) Field of Search ................................. 375/229, 232, 375/231, 350, 260, 343, 346; 370/516

(56) References Cited

U.S. PATENT DOCUMENTS 5,303,226 A    4/1994  Okanoue et al. ............... 370/17
5,901,185 A    5/1999  Hassan .......................... 375/346
6,411,649 B1 * 6/2002  Arslan et al. ................. 375/232

FOREIGN PATENT DOCUMENTS

| EP | 0 448 069 A2 | 9/1991 |
| EP | 0 604 209 A2 | 6/1994 |
| EP | 104800 | 12/2000 |

* cited by examiner

Primary Examiner—Stephen Chin
Assistant Examiner—Kevin Kim
(74) Attorney, Agent, or Firm—Jenkens & Gilchrist, P.C.

(57) ABSTRACT

A technique for efficiently equalizing a transmission channel in a data transmission system is disclosed. The technique is realized by creating a first model of a first transmission channel based upon at least a portion of a first message that has been transmitted over the first transmission channel, and then receiving a second message that has been transmitted over a second transmission channel. The first model is then evaluated so as to determine if the first model adequately represents the second transmission channel.

36 Claims, 8 Drawing Sheets

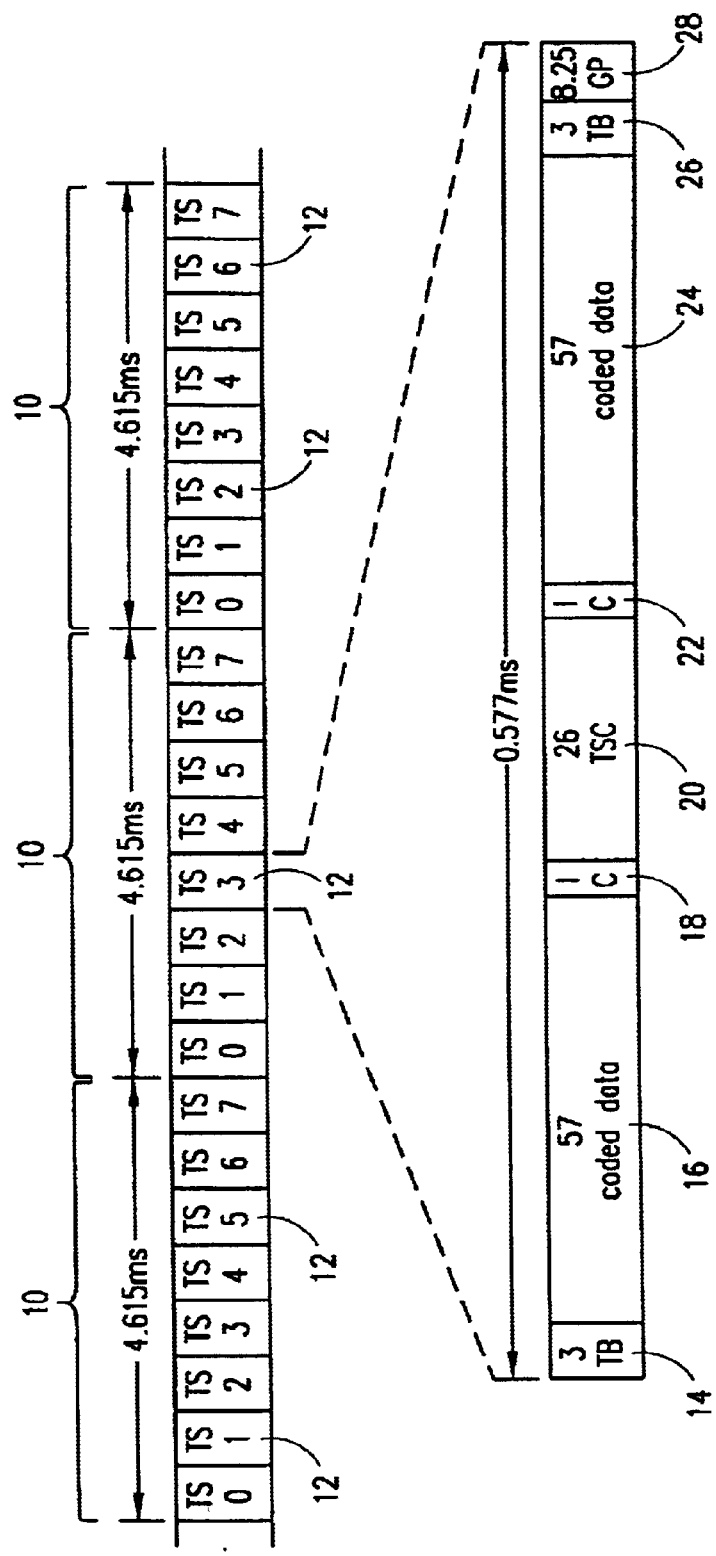
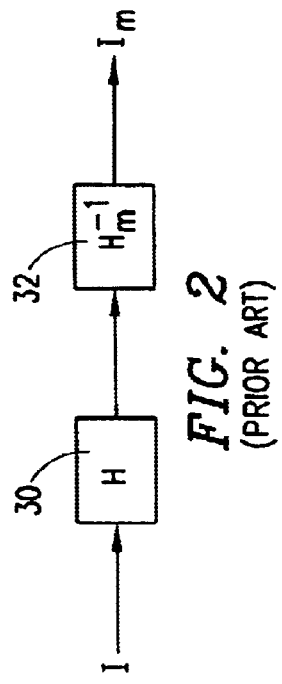
FIG. 1
(PRIOR ART)
FIG. 2
(PRIOR ART)

TECHNIQUE FOR EFFICIENTLY EQUALIZING A TRANSMISSION CHANNEL IN A DATA TRANSMISSION SYSTEM

FIELD OF THE INVENTION

The present invention relates generally to transmission channel equalization and, more particularly, to a technique for efficiently equalizing a transmission channel in a data transmission system.

BACKGROUND OF THE INVENTION

As is well known in the telecommunication arts, data transmission in accordance with the Global System for Mobile Communications (GSM) standard is accomplished using a combined Time Division Multiple Access (TDMA) and Frequency Division Multiple Access (FDMA) scheme. The TDMA component of the combined TDMA and FDMA scheme is based upon a TDMA frame structure, as shown in FIG. 1. Each TDMA frame 10 has a duration of 4.615 ms and is divided into eight time slots (TS) 12. Each time slot 12 has a duration of 0.577 ms and comprises a first 3-bit tail bits (TB) section 14, a first 57-bit coded data section 16, a first 1-bit control bit (C) section 18, a 26-bit training sequence code (TSC) section 20, a second 1-bit control bit (C) section 22, a second 57-bit coded data section 24, a second 3-bit tail bits (TB) section 26, and an 8.25-bit long guard period (GP) section 28. Thus, each time slot 12 comprises 156.25 total bits, including the 8.25-bit long guard period (GP) section 28.

As is also well known in the telecommunication arts, data reception in accordance with the GSM standard is accomplished, in part, using a channel equalizer for creating a model of a transmission channel over which a message, or burst, has been transmitted. This transmission channel model is necessary to compensate for any changes which may occur in a message, or burst, as a result of having been transmitted over the transmission channel. That is, referring to FIG. 2, a transmission channel may be represented as a filter (H) 30 encompassing all of the characteristics of the transmission channel. More particularly, the filter 30 encompasses all of the characteristics of the transmission channel that affect a message, or burst, that is transmitted over the transmission channel, such as, for example, fading, time dispersion, multipath distribution, and inter-symbol interference (ISI). As described in more detail below, a channel equalizer in a GSM receiver creates a model ($H_m$) of the transmission channel. The channel equalizer then creates an inverse of the transmission channel model, which is represented as inverse filter ($H_m^{-1}$) 32 in FIG. 2. Thus, an original message, or burst, represented by I in FIG. 2, that is passed through filter 30 and inverse filter 32, represents an original message, or burst, that is transmitted over a transmission channel and through an inverse model of the transmission channel created by a channel equalizer in a GSM receiver. A resulting message, or burst, represented by $I_m$ in FIG. 2, emerges from inverse filter 32. If the model, and hence the inverse model, of the transmission channel created by the channel equalizer in the GSM receiver is accurate, then I and $I_m$ should be identical.

As is further well known in the telecommunication arts, a channel equalizer in a GSM receiver creates a model, as well as an inverse model, of a transmission channel using the 26-bit training sequence code (TSC) described above, which is embedded in a message, or burst, that has been transmitted over the transmission channel. The 26-bit training sequence code (TSC) contains a known bit pattern, which the channel equalizer in the GSM receiver uses to predict the transmission channel over which a message, or burst, containing the 26-bit training sequence code (TSC) has been transmitted. More particularly, and with reference to FIG. 3, the channel equalizer in the GSM receiver "equalizes" the transmission channel over which the message, or burst, containing the 26-bit training sequence code (TSC) has been transmitted by first receiving the message, or burst, containing the 26-bit training sequence code (TSC), as shown in step 40. In step 42, the channel equalizer correlates the received 26-bit training sequence code (TSC) with the known bit pattern and, based upon this correlation, predicts the transmission channel over which the message, or burst, containing the 26-bit training sequence code (TSC) has been transmitted. In step 44, the channel equalizer creates a filter model of the transmission channel based upon the prediction. In step 46, the channel equalizer applies the received message, or burst, to an inverse of the filter model so as to obtain an estimation of the actual transmitted message, or burst. Finally, in step 48, the estimated message, or burst, is output for further processing within the GSM receiver.

At this point it should be noted that the quality of the filter model can be measured by applying the received 26-bit training sequence code (TSC) to the inverse of the filter model, and then comparing the result with the known bit pattern.

The above-described transmission channel equalization procedure is carried out regardless of when in time messages, or bursts, are received, due to the fact that each message, or burst, is considered to be not correlated to any other message, or burst. This is the case even with some of the new GSM phase 2+ services that are being defined such as, for example, high speed circuit switched data (HSCSD) and general packet radio service (GPRS), which operate using more than one consecutive time slot for a single connection, i.e. multiple slot operational modes. That is, channel equalization is still performed on each received message, or burst, in each corresponding time slot despite the fact that some connections utilize more than one consecutive time slot. This is due to the fact that all messages, or bursts, are still considered to be not correlated to each other despite the fact that they might be consecutively received, and thereby might have been transmitted over a common or similar transmission channel. Thus, none of the transmission channel information from a previous transmission channel equalization procedure is passed on to a subsequent transmission channel equalization procedure despite the fact that the messages, or bursts, upon which the transmission channel equalization procedures are based are consecutively received. Given these circumstances, the transmission channel equalization procedures for two consecutively received messages, or bursts, during a multiple slot mode operation cannot be performed any faster than the sum of the times required to perform each individual transmission channel equalization procedure.

The above-described multiple slot operational mode is illustrated in FIG. 4, for example, wherein four messages, or bursts, are consecutively received in each TDMA frame 10 during multiple slot mode operation, and wherein C represents the correlation/prediction and channel model building steps (i.e., steps 42 and 44 in FIG. 3 above) and E represents the message estimation steps (i.e., steps 46 and 48 in FIG. 3 above). As can be seen in FIG. 4, the correlation/prediction and channel model building steps and the message estimation steps are performed for each received message, or burst, despite the fact that the messages, or bursts, upon which the transmission channel equalization procedures are based are consecutively received. Thus, none of the transmission channel information from a previous transmission channel equalization procedure is passed on to a subsequent transmission channel equalization procedure. This is very inefficient, particularly due to the fact that the correlation/prediction and channel model building steps take up a substantial part of the overall transmission channel equalization procedure time.

In view of the foregoing, it would be desirable to provide a technique for equalizing a transmission channel in a data transmission system in a more efficient and cost effective manner.

OBJECTS OF THE INVENTION

The primary object of the present invention is to provide a technique for efficiently equalizing a transmission channel in a data transmission system.

The above-stated primary object, as well as other objects, features, and advantages, of the present invention will become readily apparent from the following detailed description which is to be read in conjunction with the appended drawings.

SUMMARY OF THE INVENTION

According to the present invention, a technique for efficiently equalizing a transmission channel in a data transmission system is provided. In a preferred embodiment, the technique is realized by creating a first model of a first transmission channel based upon at least a portion of a first message that has been transmitted over the first transmission channel, and then receiving a second message that has been transmitted over a second transmission channel. The first model is then evaluated so as to determine if the first model adequately represents the second transmission channel.

The first and second transmission channels can be, for example, air channels, and the first model can be, for example, a filter model of the first transmission channel, although the present invention is not limited in this regard. Also, the first and second messages can be, for example, GSM messages, and the portion of the first message that has been transmitted over the first transmission channel can be, for example, a training sequence code in a GSM message, although the present invention is not limited in this regard. Further, the first message is received prior to the second message, and the first and second messages are preferably consecutively received such as in, for example, the multiple slot mode operation of a GSM phase 2+ service, although the present invention is not limited in this regard. That is, the present invention technique can also be used in single slot mode operation, as well as in other operational modes and with other standards.

In accordance with other aspects of the present invention, at least a portion of the second message has a value that is known prior to transmission, and the first model can be evaluated by applying the portion of the second message having the value that is known prior to transmission to an inverse of the first model so as to generate an output from the inverse of the first model, and then comparing the output from the inverse of the first model to the known value. If the comparison reveals that the first model adequately represents the second transmission channel, then any remaining portions of the second message are applied to an inverse of the first model so as to determine values that any remaining portions of the second message had prior to transmission. Alternatively, if the comparison reveals that the first model does not adequately represent the second transmission channel, then a second model is created representing the second transmission channel. The second model is preferably created based upon the portion of the second message having the value that is known prior to transmission. As with the portion of the first message, the portion of the second message having the value that is known prior to transmission can be, for example, a training sequence code in a GSM message, although the present invention is not limited in this regard.

In accordance with further aspects of the present invention, a second model can be created representing the second transmission channel, wherein the creation of the second model is performed concurrently with the evaluation of the first model. The creation of the second model is typically terminated if the evaluation of the first model reveals that the first model adequately represents the second transmission channel. However, the creation of the second model may be allowed to proceed even if the step of evaluating the first model reveals that the first model adequately represents the second transmission channel. For example, the creation of the second model may be allowed to proceed in order to handle adaptation. On the other hand, the evaluation of the first model is typically terminated if the evaluation of the first model reveals that the first model does not adequately represent the second transmission channel.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 1 shows a prior art GSM TDMA frame structure, including the details of a TDMA time slot.

FIG. 2 is a block diagram including a representative transmission channel filter and a representative transmission channel inverse model filter for illustrating the necessity of channel equalization in a data transmission system.

DETAILED DESCRIPTION OF PREFERRED EMBODIMENTS

Figure 3:
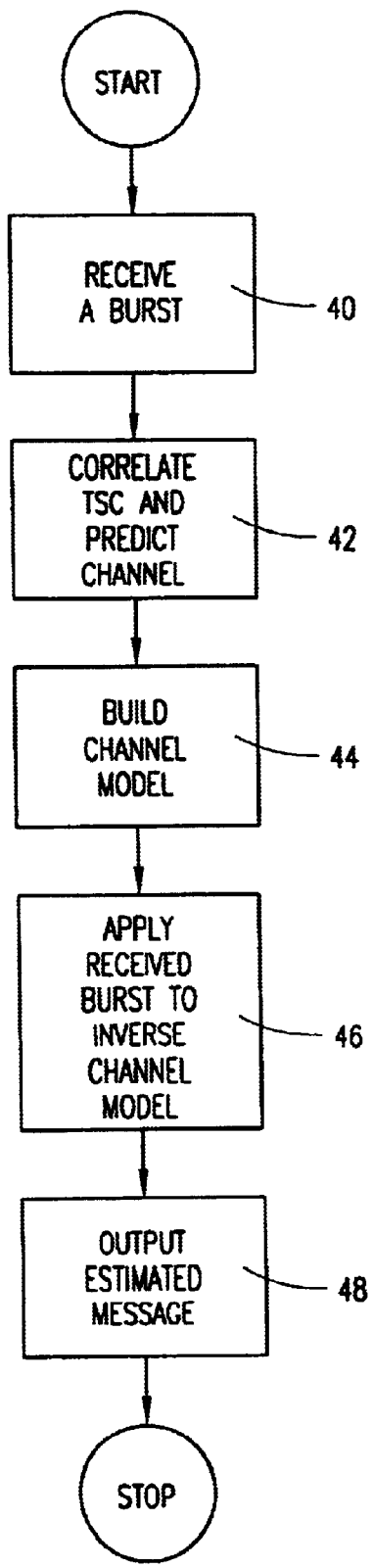
FIG. 3 is a flowchart illustrating a prior art transmission channel equalization procedure.

The present invention provides a technique for reducing the overall transmission channel equalization procedure time in a data transmission system by using transmission channel filter characteristics that were generated during a previous transmission channel equalization procedure in a subsequent transmission channel equalization procedure. That is, the transmission channel filter characteristics that were generated during a previous transmission channel equalization procedure are evaluated for use in a subsequent transmission channel equalization procedure. If the evaluation reveals that the transmission channel filter characteristics that were generated during the previous transmission channel equalization procedure adequately represent the transmission channel over which a recently received message, or burst, has been transmitted, then the transmission channel filter characteristics that were generated during the previous transmission channel equalization procedure are used in an abbreviated transmission channel equalization procedure for the recently received message, or burst. The abbreviated transmission channel equalization procedure for the recently received message, or burst, does not perform the time consuming correlation/prediction and channel model building steps (i.e., steps 42 and 44 in FIG. 3 above) of the prior art, thereby reducing the overall transmission channel equalization procedure time.

Figure 5:
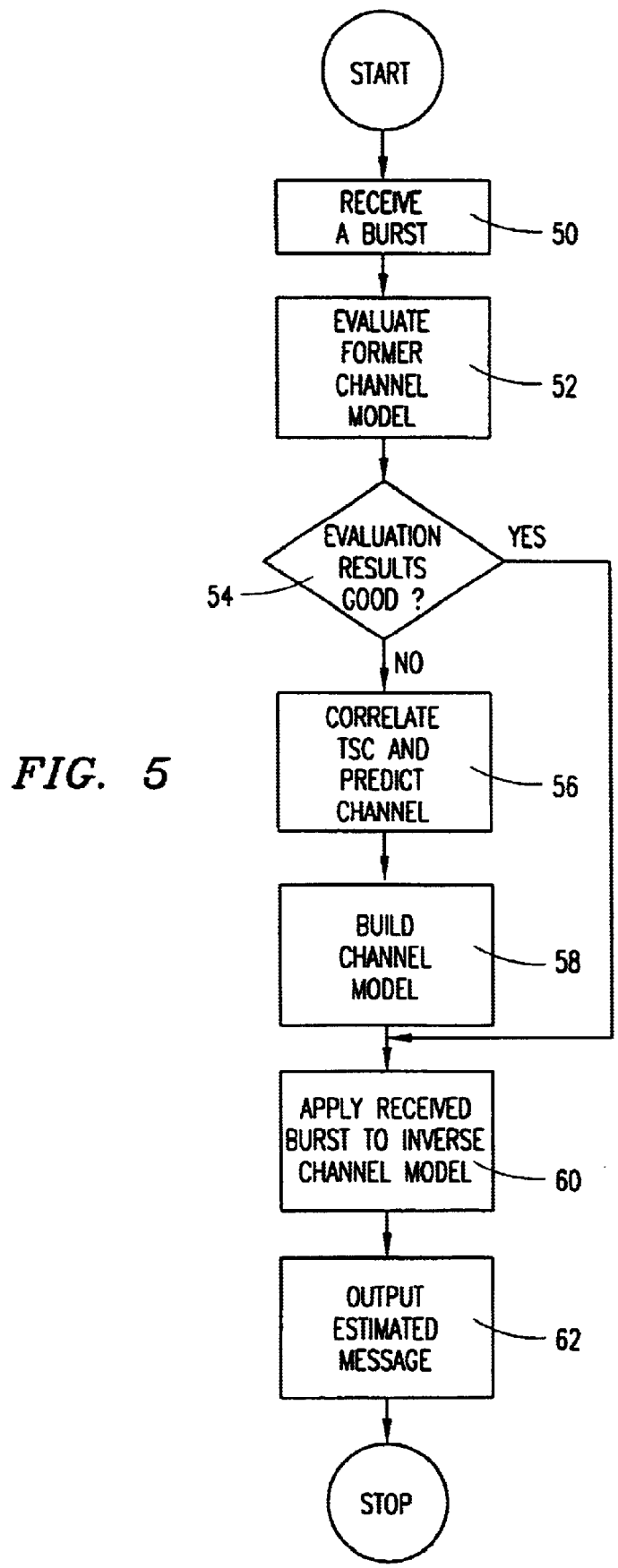
FIG. 5 is a flowchart illustrating a first embodiment of a transmission channel equalization procedure in accordance with the present invention.

Referring to FIG. 5, there is shown a flowchart illustrating a first embodiment of the present invention technique. That is, in accordance with a first embodiment of the present invention, a channel equalizer in a GSM receiver "equalizes" a transmission channel over which a message, or burst, containing a 26-bit training sequence code (TSC) has been transmitted by first receiving the message, or burst, containing the 26-bit training sequence code (TSC), as shown in step 50. In step 52, the channel equalizer evaluates the transmission channel filter characteristics that were generated during a previous transmission channel equalization procedure for use in the present transmission channel equalization procedure. The channel equalizer preferably evaluates the transmission channel filter characteristics that were generated during a previous transmission channel equalization procedure by applying the recently received 26-bit training sequence code (TSC) to the inverse of the previously created filter model, and then comparing the result to the known bit pattern. In step 54, if the evaluation reveals that the transmission channel filter characteristics (i.e., the previously created filter model) that were generated during the previous transmission channel equalization procedure do not adequately represent the transmission channel over which the recently received message, or burst, has been transmitted, then the channel equalizer proceeds to the correlation/prediction and channel model building steps (i.e., steps 56 and 58 in FIG. 5, which are similar to steps 42 and 44 in FIG. 3) and to the message estimation steps (i.e., steps 60 and 62 in FIG. 5, which are similar to steps 46 and 48 in FIG. 3), as in the prior art. That is, the channel equalizer proceeds to step 56 wherein the channel equalizer correlates the recently received 26-bit training sequence code (TSC) with the known bit pattern and, based upon this correlation, predicts the transmission channel over which the message, or burst, containing the 26-bit training sequence code (TSC) has been transmitted. Then, in step 58, the channel equalizer creates a filter model of the transmission channel based upon the prediction. Then, in step 60, the channel equalizer applies the recently received message, or burst, to an inverse of the filter model so as to obtain an estimation of the actual transmitted message, or burst. Finally, in step 62, the estimated message, or burst, is output for further processing within the GSM receiver.

However, in step 54, if the evaluation reveals that the transmission channel filter characteristics (i.e., the previously created filter model) that were generated during the previous transmission channel equalization procedure adequately represent the transmission channel over which the recently received message, or burst, has been transmitted, then the channel equalizer skips the correlation/prediction and channel model building steps (i.e., steps 56 and 58 in FIG. 5, which are similar to steps 42 and 44 in FIG. 3) and proceeds directly to the message estimation steps (i.e., steps 60 and 62 in FIG. 5, which are similar to steps 46 and 48 in FIG. 3), in accordance with the present invention. That is, the channel equalizer proceeds directly to step 60, wherein the channel equalizer applies the recently received message, or burst, to an inverse of the previously created filter model so as to obtain an estimation of the actual transmitted message, or burst. Then, in step 62, the estimated message, or burst, is output for further processing within the GSM receiver. This abbreviated transmission channel equalization procedure takes considerably less time due to the elimination of the correlation/prediction and channel model building steps (i.e., steps 56 and 58 in FIG. 5, which are similar to steps 42 and 44 in FIG. 3). Thus, the present invention technique reduces the overall transmission channel equalization procedure time, and thereby makes the transmission channel equalization procedure more efficient.

Figure 4:
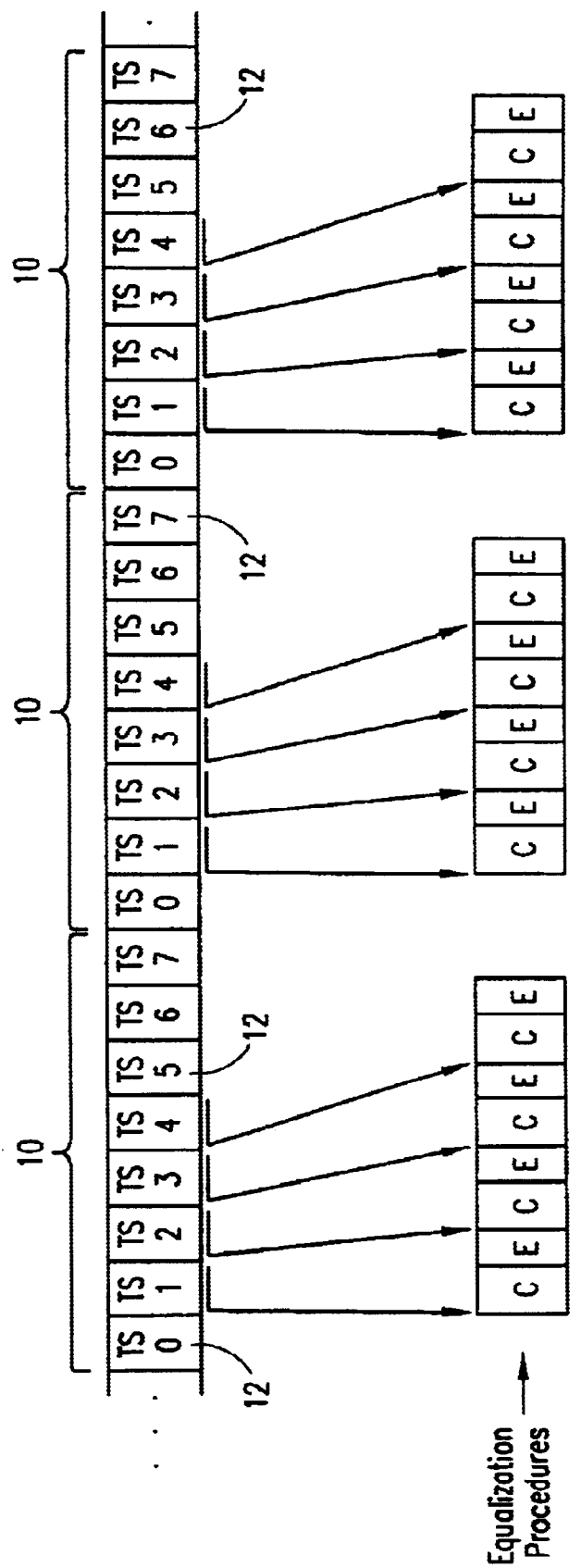
FIG. 4 illustrates how transmission channel equalization procedure times are additive in the prior art for consecutively received messages, or bursts, during multiple slot mode operation.
Figure 6:
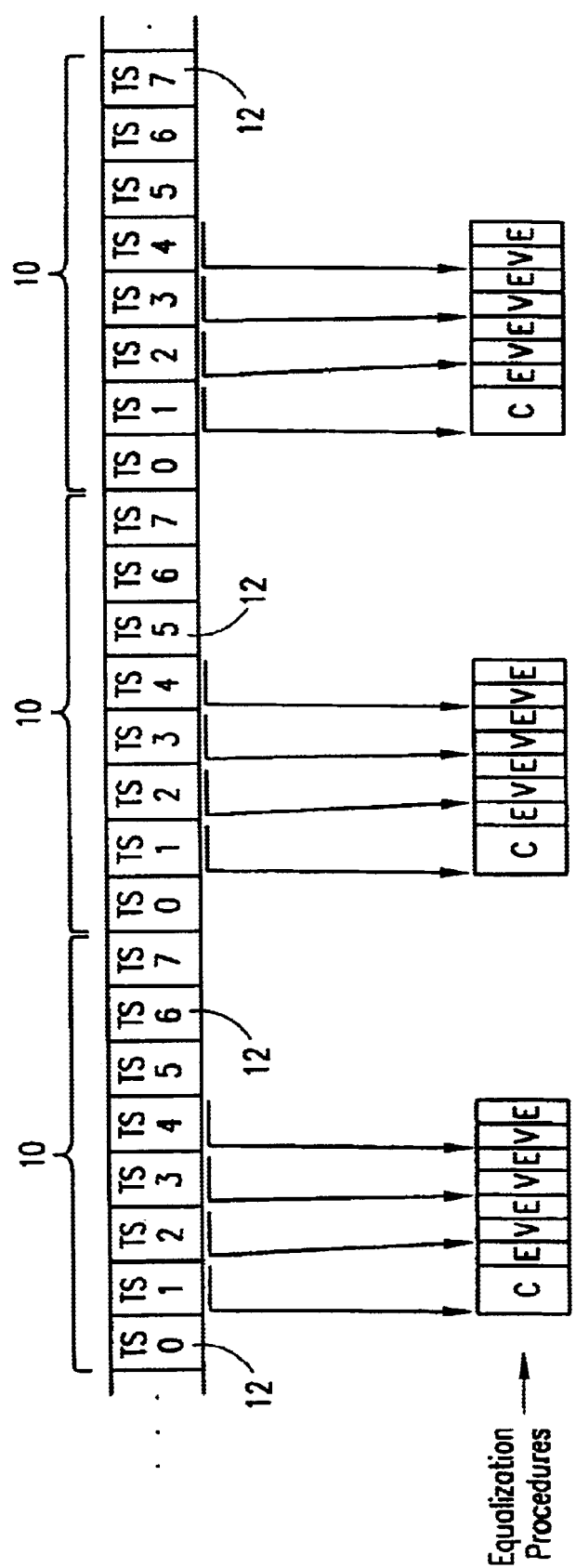
FIG. 6 illustrates how transmission channel equalization procedure times can be reduced for consecutively received messages, or bursts, during multiple slot mode operation in accordance with the present invention.

Referring to FIG. 6, the above-described present invention technique is further illustrated in a manner similar to that shown in FIG. 4. That is, a multiple slot operational mode is illustrated in FIG. 6 wherein four messages, or bursts, are consecutively received in each TDMA frame 10 during multiple slot mode operation, and wherein C represents the correlation/prediction and channel model building steps (i.e., steps 56 and 58 in FIG. 5 above), E represents the message estimation steps (i.e., steps 60 and 62 in FIG. 5 above), and V represents the evaluation step (i.e., step 52 in FIG. 5 above). As can be seen in FIG. 6, the correlation/prediction and channel model building steps are performed for only a first of the four consecutively received messages, or bursts, in each TDMA frame 10. For the following three consecutively received messages, or bursts, in each TDMA frame 10, the correlation/prediction and channel model building steps are skipped based upon good evaluation results achieved in the performance of the evaluation steps. In each of these following three consecutively received messages, or bursts, the message estimation steps are performed using the transmission channel information (i.e., the transmission channel filter model) that was generated during the transmission channel equalization procedure for the first of the four consecutively received messages, or bursts. Thus, in accordance with the present invention, the transmission channel information (i.e., the transmission channel filter model) that is used to perform the message estimation steps is determined based upon the results achieved in the performance of the evaluation steps.

Figure 7:
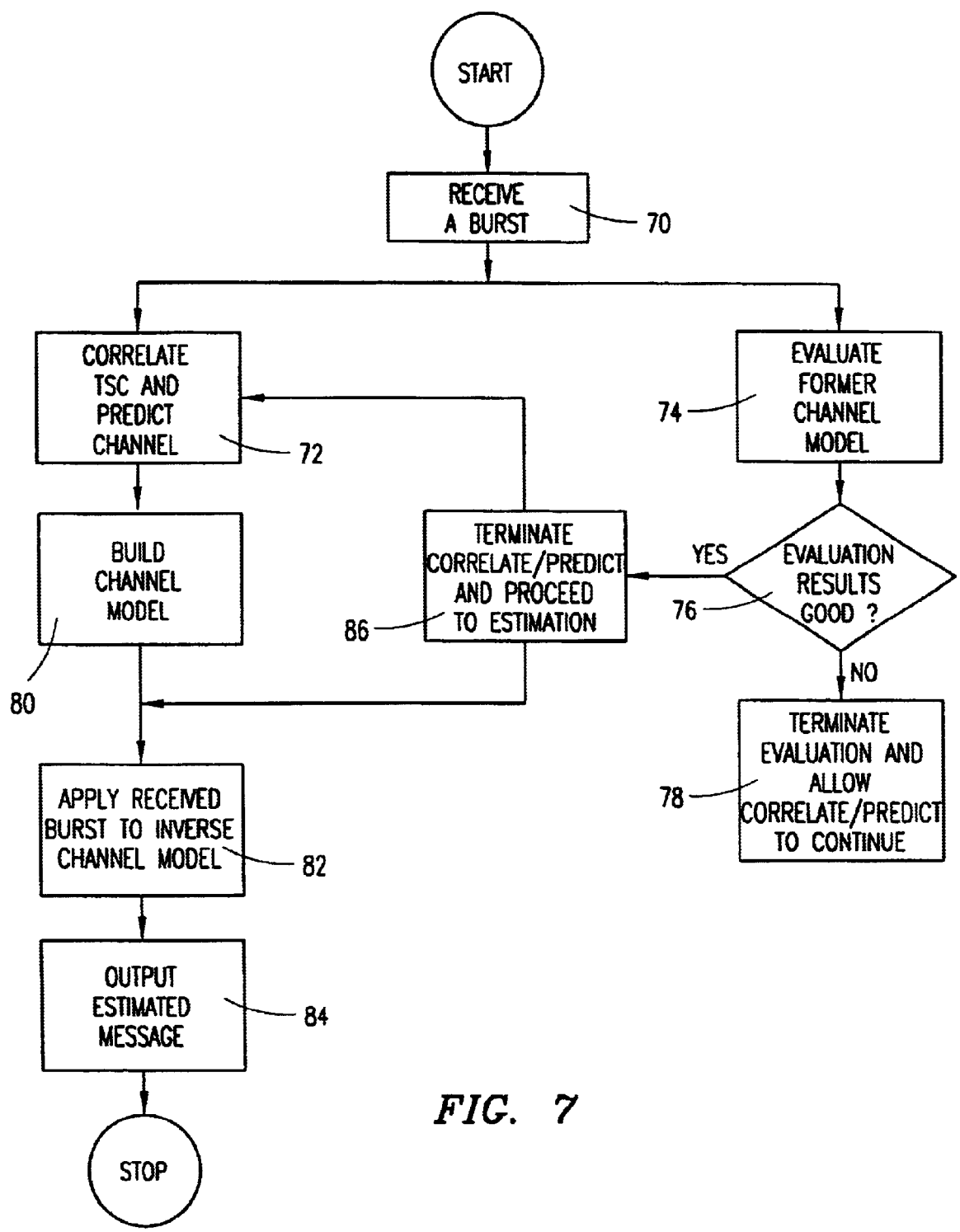
FIG. 7 is a flowchart illustrating a second embodiment of a transmission channel equalization procedure in accordance with the present invention.

Referring to FIG. 7, there is shown a flowchart illustrating a second embodiment of the present invention technique. In this second embodiment of the present invention, the overall transmission channel equalization procedure time is reduced and the efficiency of the transmission channel equalization procedure is increased by starting both the correlation/prediction step (i.e., step. 72 in FIG. 7, which is similar to step 56 in FIG. 5 and step 42 in FIG. 3) and the evaluation step (i.e., step 74 in FIG. 7, which is similar to step 52 in FIG. 5), but then ending the correlation/prediction step if the evaluation reveals that the transmission channel filter characteristics (i.e., the previously created filter model) that were generated during the previous transmission channel equalization procedure adequately represent the transmission channel over which the recently received message, or burst, has been transmitted. That is, in accordance with a second embodiment of the present invention, a channel equalizer in a GSM receiver "equalizes" a transmission channel over which a message, or burst, containing a 26-bit training sequence code (TSC) has been transmitted by first receiving the message, or burst, containing the 26-bit training sequence code (TSC), as shown in step 70. In step 72, the channel equalizer begins to correlate the recently received 26-bit training sequence code (TSC) with the known bit pattern and, based upon this correlation, begins to predict the transmission channel over which the message, or burst, containing the 26-bit training sequence code (TSC) has been transmitted. At the same time, in step 74, the channel equalizer begins to evaluate the transmission channel filter characteristics that were generated during a previous transmission channel equalization procedure for use in the present transmission channel equalization procedure. Again, the channel equalizer preferably evaluates the transmission channel filter characteristics that were generated during a previous transmission channel equalization procedure by applying the recently received 26-bit training sequence code (TSC) to the inverse of the previously created filter model, and then comparing the result to the known bit pattern. Since the evaluation step (i.e., step 74 in FIG. 7) requires much less processing time than the correlation/prediction step (i.e., step 72 in FIG. 7), the results of the evaluation are used to determine whether the correlation/prediction step (i.e., step 72 in FIG. 7) may be terminated or is allowed to continue. That is, in step 76, if the evaluation reveals that the transmission channel filter characteristics (i.e., the previously created filter model) that were generated during the previous transmission channel equalization procedure do not adequately represent the transmission channel over which the recently received message, or burst, has been transmitted, then the channel equalizer terminates the evaluation process and allows the correlation/prediction process to continue (see step 78). Thus, the channel equalizer terminates the evaluation process and allows the correlation/prediction process to continue wherein, in step 72, the channel equalizer correlates the recently received 26-bit training sequence code (TSC) with the known bit pattern and, based upon this correlation, predicts the transmission channel over which the message, or burst, containing the 26-bit training sequence code (TSC) has been transmitted. Then, in step 80, the channel equalizer creates a filter model of the transmission channel based upon the prediction. Then, in step 82, the channel equalizer applies the recently received message, or burst, to an inverse of the filter model so as to obtain an estimation of the actual transmitted message, or burst. Finally, in step 84, the estimated message, or burst, is output for further processing within the GSM receiver.

However, in step 76, if the evaluation reveals that the transmission channel filter characteristics (i.e., the previously created filter model) that were generated during the previous transmission channel equalization procedure adequately represent the transmission channel over which the recently received message, or burst, has been transmitted, then the channel equalizer terminates the correlation/prediction process and proceeds directly to the message estimation steps (see step 86). That is, the channel equalizer terminates the correlation/prediction process and proceeds directly to the message estimation steps (i.e., steps 82 and 84 in FIG. 7, which are similar to steps 60 and 62 in FIG. 5 and steps 46 and 48 in FIG. 3), in accordance with the present invention. Thus, the channel equalizer skips the correlation/prediction and channel model building steps (i.e., steps 72 and 80 in FIG. 7, which are similar to steps 56 and 58 in FIG. 5 and steps 42 and 44 in FIG. 3) and proceeds directly to the message estimation steps (i.e., steps 82 and 84 in FIG. 7, which are similar to steps 60 and 62 in FIG. 5 and steps 46 and 48 in FIG. 3), in accordance with the present invention. Accordingly, the channel equalizer proceeds directly to step 82, wherein the channel equalizer applies the recently received message, or burst, to an inverse of the previously created filter model so as to obtain an estimation of the actual transmitted message, or burst. Then, in step 84, the estimated message, or burst, is output for further processing within the GSM receiver. As with the first embodiment of the present invention described above, this abbreviated transmission channel equalization procedure takes considerably less time due to the elimination of the correlation/prediction and channel model building steps (i.e., steps 72 and 80 in FIG. 7, which are similar to steps 56 and 58 in FIG. 5 and steps 42 and 44 in FIG. 3). Thus, the present invention technique reduces the overall transmission channel equalization procedure time, and thereby makes the transmission channel equalization procedure more efficient.

At this point it should be noted that, as an alternative, the channel equalizer may allow the correlation/prediction process to proceed in order to handle adaptation even if the evaluation reveals that the transmission channel filter characteristics (i.e., the previously created filter model) that were generated during the previous transmission channel equalization procedure adequately represent the transmission channel over which the recently received message, or burst, has been transmitted.

Figure 8:
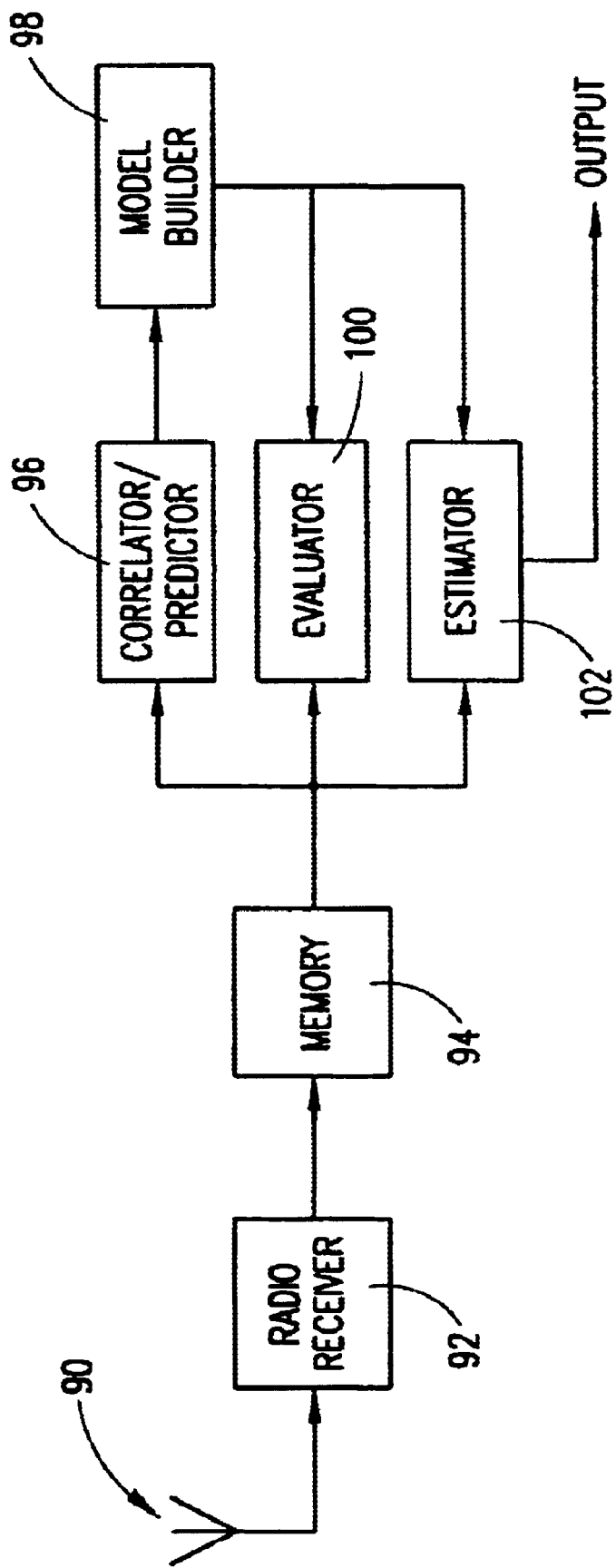
FIG. 8 is a block diagram illustrating the relevant components of a GSM receiver that are utilized in the performance of a transmission channel equalization procedure in accordance with the present invention.

Referring to FIG. 8, there is shown a block diagram illustrating the relevant components of a GSM receiver that are utilized in the performance of a transmission channel equalization procedure in accordance with the present invention. The GSM receiver includes an antenna 90, a radio receiver 92, a memory 94, a correlator/predictor 96, a model builder 98, an evaluator 100, and an estimator 102. The antenna 90 receives radio transmissions over a transmission channel (e.g., an air channel). The radio receiver 92 tunes into the reception frequency over which a particular message, or burst, containing a 26-bit training sequence code (TSC) is to be received. The memory 94 stores the received message, or burst, containing the 26-bit training sequence code (TSC) The correlator/predictor 96 correlates the received 26-bit training sequence code (TSC) with a known bit pattern and, based upon this correlation, predicts the transmission channel over which the message, or burst, containing the 26-bit training sequence code (TSC) has been transmitted. The model builder 98 creates a filter model (and its inverse) of the transmission channel based upon the prediction. The evaluator 100 evaluates the filter model that was generated during a previous transmission channel equalization procedure for use in the present transmission channel equalization procedure. The estimator 102 applies the received message, or burst, to the inverse of the filter model that has been chosen for use in the present transmission channel equalization procedure so as to obtain an estimation of the actual transmitted message, or burst. The estimator 102 outputs the estimated message, or burst, for further processing within the GSM receiver.

Figure 9:
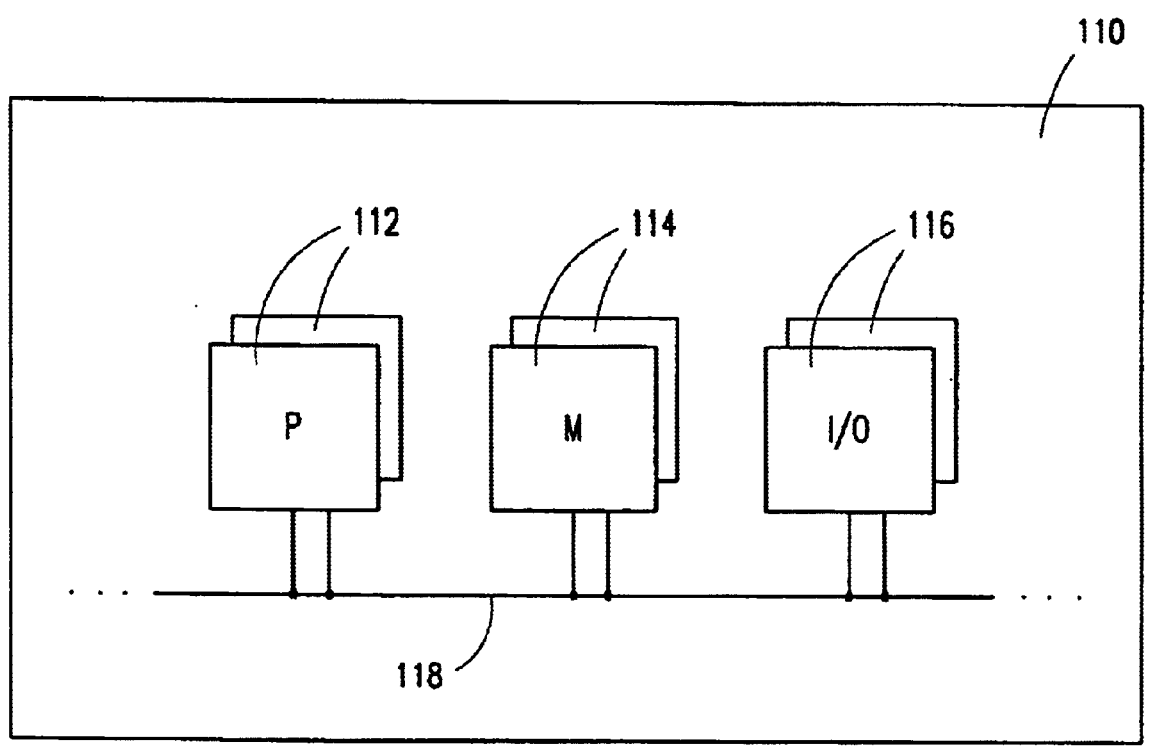
FIG. 9 is a block diagram illustrating a processing device for facilitating the implementation of input data processing and output data generation in the components of a GSM receiver performing a transmission channel equalization procedure in accordance with the present invention.

At this point it should be noted that the radio receiver 92, the memory 94, the correlator/predictor 96, the model builder 98, the evaluator 100, and the estimator 102 all involve the processing of input data and the generation of output data to some extent. The processing of the input data and the generation of the output data are preferably implemented by software programs within each of the above-described components. Thus, referring to FIG. 9, each of the above-described components preferably comprises a processing device 110 including at least one processor (P) 112, memory (M) 114, and input/output (I/O) interface 116, connected to each other by a bus 118, for facilitating the implementation of input data processing and output data generation in each of the above-described components.

Lastly, it should be noted that the present invention technique for reducing the overall transmission channel equalization procedure time in a data transmission system is not limited to use in multiple slot mode operation. That is, the present invention technique can also be used in single slot mode operation, as well as in other operational modes, for reducing the overall transmission channel equalization procedure time in a data transmission system by using transmission channel filter characteristics that were generated during a previous transmission channel equalization procedure in a subsequent transmission channel equalization procedure.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the following appended claims.

What is claimed is:

1. A method for efficiently equalizing a transmission channel in a data transmission system, the method comprising the steps of:
    creating a first model of a first transmission channel based upon at least a portion of a first message that has been transmitted over the first transmission channel;
    receiving a second message that has been transmitted over a second transmission channel; and
    evaluating the first model so as to determine if the first model adequately represents the second transmission channel; and
    filtering said received second message using said first model to obtain an estimated second message if the first model accurately represents the second transmission channel.

2. The method as defined in claim 1, wherein the first message is received prior to the second message.

3. The method as defined in claim 2, wherein the first message and the second message are consecutively received.

4. The method as defined in claim 1, wherein at least a portion of the second message has a value that is known prior to transmission, and wherein the step of evaluating the first model includes the steps of:
    applying the portion of the second message having the value that is known prior to transmission to an inverse of the first model so as to generate an output from the inverse of the first model; and
    comparing the output from the inverse of the first model to the known value.

5. The method as defined in claim 4, wherein the step of comparing reveals that the first model adequately represents the second transmission channel, further comprising the step of:
    applying any remaining portions of the second message to an inverse of the first model so as to determine values that any remaining portions of the second message had prior to transmission.

6. The method as defined in claim 4, wherein the step of comparing reveals that the first model does not adequately represent the second transmission channel, further comprising the step of:
    creating a second model representing the second transmission channel.

7. The method as defined in claim 6, wherein the second model is created based upon the portion of the second message having the value that is known prior to transmission.

8. The method as defined in claim 7, wherein the portion of the second message having the value that is known prior to transmission and upon which the creation of the second model is based is a training sequence code in a GSM message.

9. The method as defined in claim 1, further comprising the step of:
    creating a second model representing the second transmission channel;
    wherein the step of creating the second model is performed concurrently with the step of evaluating the first model.

10. The method as defined in claim 9, wherein the step of creating the second model is terminated if the step of evaluating the first model reveals that the first model adequately represents the second transmission channel.

11. The method as defined in claim 9, wherein the step of creating the second model is allowed to proceed even if the step of evaluating the first model reveals that the first model adequately represents the second transmission channel.

12. The method as defined in claim 9, wherein the step of evaluating the first model is terminated if the step of evaluating the first model reveals that the first model does not adequately represent the second transmission channel.

13. An apparatus for efficiently equalizing a transmission channel in a data transmission system, the apparatus comprising:
    a model builder configured to create a first model of a first transmission channel based upon at least a portion of a first message that has been transmitted over the first transmission channel;
    a receiver configured to receive a second message that has been transmitted over a second transmission channel; and
    an evaluator configured to evaluate the first model so as to determine if the first model adequately represents the second transmission channel; and
    an estimator configured to filter said received second message using said first model to obtain an estimated second message if the first model accurately represents the second transmission channel.

14. The apparatus as defined in claim 13, wherein the first message is received prior to the second message at the receiver.

15. The apparatus as defined in claim 14, wherein the first message and the second message are consecutively received by the receiver.

16. The apparatus as defined in claim 13, wherein at least a portion of the second message has a value that is known prior to transmission, and wherein the evaluator is further configured to:
    apply the portion of the second message having the value that is known prior to transmission to an inverse of the first model so as to generate an output from the inverse of the first model; and
    compare the output from the inverse of the first model to the known value.

17. The apparatus as defined in claim 16, wherein the comparison reveals that the first model adequately represents the second transmission channel, and wherein the estimator is further configured to apply any remaining portions of the second message to an inverse of the first model so as to determine values that any remaining portions of the second message had prior to transmission.

18. The apparatus as defined in claim 16, wherein the comparison reveals that the first model does not adequately represent the second transmission channel, and wherein the model builder is further configured to:

create a second model representing the second transmission channel.

19. The apparatus as defined in claim 18, wherein the second model is created based upon the portion of the second message having the value that is known prior to transmission.

20. The apparatus as defined in claim 19, wherein the portion of the second message having the value that is known prior to transmission and upon which the creation of the second model is based is a training sequence code in a GSM message.

21. The apparatus as defined in claim 13, wherein the model builder is further configured to:

create a second model representing the second transmission channel, wherein the creation of the second model is performed concurrently with the evaluation of the first model.

22. The apparatus as defined in claim 21, wherein the creation of the second model is terminated if the evaluation of the first model reveals that the first model adequately represents the second transmission channel.

23. The apparatus as defined in claim 21, wherein the creation of the second model is allowed to proceed even if the evaluation of the first model reveals that the first model adequately represents the second transmission channel.

24. The apparatus as defined in claim 21, wherein the evaluation of the first model is terminated if the evaluation of the first model reveals that the first model does not adequately represent the second transmission channel.

25. An article of manufacture for efficiently equalizing a transmission channel in a data transmission system, the article of manufacture comprising:

at least one processor readable carrier; and instructions carried on the at least one carrier; wherein the instructions are configured to be readable from the at least one carrier by at least one processor and thereby cause the at least one processor to operate so as to:

create a first model of a first transmission channel based upon at least a portion of a first message that has been transmitted over the first transmission channel;

receive a second message that has been transmitted over a second transmission channel;

evaluate the first model so as to determine if the first model adequately represents the second transmission channel and;

filter said received second message using said first model to obtain an estimated second message if the first model accurately represents the second transmission channel.

26. The article of manufacture as defined in claim 25, wherein the first message is received prior to the second message.

27. The article of manufacture as defined in claim 26, wherein the first message and the second message are consecutively received.

28. The article of manufacture as defined in claim 25, wherein at least a portion of the second message has a value that is known prior to transmission, and wherein the instructions further cause the at least one processor to operate so as to:

apply the portion of the second message having the value that is known prior to transmission to an inverse of the first model so as to generate an output from the inverse of the first model; and compare the output from the inverse of the first model to the known value.

29. The article of manufacture as defined in claim 28, wherein the step of comparing reveals that the first model adequately represents the second transmission channel, and wherein the instructions further cause the at least one processor to operate so as to:

apply any remaining portions of the second message to an inverse of the first model so as to determine values that any remaining portions of the second message had prior to transmission.

30. The article of manufacture as defined in claim 28, wherein the step of comparing reveals that the first model does not adequately represent the second transmission channel, wherein the instructions further cause the at least one processor to operate so as to:

create a second model representing the second transmission channel.

31. The article of manufacture as defined in claim 30, wherein the second model is created based upon the portion of the second message having the value that is known prior to transmission.

32. The article of manufacture as defined in claim 31, wherein the portion of the second message having the value that is known prior to transmission and upon which the creation of the second model is based is a training sequence code in a GSM message.

33. The article of manufacture as defined in claim 25, wherein the instructions further cause the at least one processor to operate so as to:

create a second model representing the second transmission channel;

wherein the creation of the second model is performed concurrently with the evaluation of the first model.

34. The article of manufacture as defined in claim 33, wherein the creation of the second model is terminated if the evaluation of the first model reveals that the first model adequately represents the second transmission channel.

35. The article of manufacture as defined in claim 33, wherein the creation of the second model is allowed to proceed even if the evaluation of the first model reveals that the first model adequately represents the second transmission channel.

36. The article of manufacture as defined in claim 33, wherein the evaluation of the first model is terminated if the evaluation of the first model reveals that the first model does not adequately represent the second transmission channel.

* * * * *